(12) United States Patent
Okada et al.

(10) Patent No.: US 8,208,738 B2
(45) Date of Patent: *Jun. 26, 2012

(54) IMAGE CODING METHOD AND APPARATUS, AND IMAGE DECODING METHOD AND APPARATUS

(75) Inventors: Shigeyuki Okada, Ogaki (JP); Kazuhiko Taketa, Higashi-Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 846 days.

This patent is subject to a terminal disclaimer.

(21) Appl. No.: 11/718,291

(22) PCT Filed: Oct. 25, 2005

(86) PCT No.: PCT/JP2005/019583
§ 371 (c)(1),
(2), (4) Date: Apr. 30, 2007

(87) PCT Pub. No.: WO2006/046551
PCT Pub. Date: May 4, 2006

(65) Prior Publication Data
US 2008/0075373 A1    Mar. 27, 2008

(30) Foreign Application Priority Data

Oct. 29, 2004 (JP) ................................ 2004-316735

(51) Int. Cl.
*G06K 9/36* (2006.01)
*G06K 9/46* (2006.01)
(52) U.S. Cl. ........ 382/232; 382/233; 382/236; 382/240; 382/243
(58) Field of Classification Search .................. 382/233, 382/232, 236, 240, 243
See application file for complete search history.

(56) References Cited

U.S. PATENT DOCUMENTS

| | | | |
|---|---|---|---|
| 4,903,317 A | | 2/1990 | Nishihara et al. |
| 5,563,960 A | * | 10/1996 | Shapiro .................. 382/239 |
| 5,608,458 A | | 3/1997 | Chen et al. |
| 5,799,109 A | | 8/1998 | Chung et al. |
| 5,978,034 A | | 11/1999 | Hosaka |
| 6,457,030 B1 | * | 9/2002 | Adams et al. .................. 715/239 |
| 6,584,230 B2 | | 6/2003 | Yamaguchi et al. |
| 7,650,567 B2 | * | 1/2010 | Itoh et al. ...................... 715/243 |
| 2001/0024525 A1 | | 9/2001 | Hata et al. |

(Continued)

FOREIGN PATENT DOCUMENTS

CN    1305684 A    7/2001

(Continued)

OTHER PUBLICATIONS

Chinese Office Action for corresponding CN Application No. 200510007933.4, dated Jan. 22, 2010, pp. 1-15, China.

(Continued)

*Primary Examiner* — Bernard Krasnic
(74) *Attorney, Agent, or Firm* — Ditthavong Mori & Steiner, P.C.

(57) ABSTRACT

In an image coding apparatus, a ROI setting unit sets a ROI region in an image. An entropy coding unit entropy-codes the image. A ROI information coding unit encodes information for specifying the ROI region. A codestream generator generates a codestream in a manner that the coded image and the coded information are explicitly included in the codestream. When a plurality of ROI regions are set in the image, the information may include a degree of priority.

11 Claims, 5 Drawing Sheets

U.S. PATENT DOCUMENTS

| | | |
|---|---|---|
| 2001/0048770 A1 | 12/2001 | Maeda |
| 2002/0126906 A1 | 9/2002 | Christopoulos et al. |
| 2002/0154823 A1 | 10/2002 | Okada |
| 2003/0025812 A1* | 2/2003 | Slatter .................... 348/240.2 |
| 2004/0095477 A1 | 5/2004 | Maki et al. |
| 2004/0228403 A1* | 11/2004 | Yu ........................ 375/240.03 |
| 2005/0025371 A1 | 2/2005 | Atsumi et al. |
| 2005/0175251 A1 | 8/2005 | Taketa et al. |
| 2006/0072667 A1 | 4/2006 | Kirenko et al. |
| 2006/0168517 A1* | 7/2006 | Itoh et al. .................... 715/517 |
| 2007/0230658 A1 | 10/2007 | Okada et al. |
| 2007/0237409 A1 | 10/2007 | Atsumi et al. |

FOREIGN PATENT DOCUMENTS

| | | |
|---|---|---|
| CN | 1320337 A | 10/2001 |
| CN | 1420633 A | 5/2003 |
| CN | 1496110 A | 5/2004 |
| CN | 200510081494.1 | 8/2007 |
| CN | 200510007933.4 | 11/2007 |
| CN | 200510081494.1 | 2/2008 |
| CN | 200580036816.9 | 4/2008 |
| JP | 04-022280 A | 1/1992 |
| JP | 05-300516 A | 11/1993 |
| JP | 7-203434 | 8/1995 |
| JP | 07-288806 A | 10/1995 |
| JP | 8-280030 | 10/1996 |
| JP | 9-18876 A | 1/1997 |
| JP | 9-46710 A | 2/1997 |
| JP | 10-98732 | 4/1998 |
| JP | 10-271510 | 10/1998 |
| JP | 10-304353 A | 11/1998 |
| JP | 10-304353 A | 11/1998 |
| JP | 11-75178 A | 3/1999 |
| JP | 2001-45484 | 2/2001 |
| JP | 2001-045484 A | 2/2001 |
| JP | 2001-119625 | 4/2001 |
| JP | 2001-128126 | 5/2001 |
| JP | 2001-160062 A | 6/2001 |
| JP | 2001-160062 A | 6/2001 |
| JP | 2001-313944 A | 11/2001 |
| JP | 2002-044551 | 2/2002 |
| JP | 2002-94991 | 3/2002 |
| JP | 2002-508606 A | 3/2002 |
| JP | 2002-135593 A | 5/2002 |
| JP | 2002-325257 | 11/2002 |
| JP | 2002-330951 | 11/2002 |
| JP | 2003-204436 | 7/2003 |
| JP | 2003-284071 A | 10/2003 |
| JP | 2003-299033 A | 10/2003 |
| JP | 2003-399047 A | 11/2003 |
| JP | 2004-040429 A | 2/2004 |
| JP | 2004-072655 A | 3/2004 |
| JP | 2004-228680 A | 8/2004 |
| JP | 2004-228680 A | 8/2004 |
| JP | 2004-240844 A | 8/2004 |
| JP | 2004-272712 A | 9/2004 |
| JP | 2004-316735 | 6/2008 |
| JP | 2004-094449 | 7/2008 |
| JP | 2004-190802 | 7/2008 |
| JP | 2004-032383 | 8/2008 |
| WO | WO 99/49412 | 9/1999 |
| WO | WO 99/49413 | 9/1999 |
| WO | WO 00/01153 A1 | 1/2000 |
| WO | WO 00/22832 | 4/2000 |
| WO | WO 03/034740 A1 | 4/2003 |
| WO | WO 2004/081799 A1 | 9/2004 |
| WO | WO 2004081799 A1 * | 9/2004 |
| WO | PCT/JP2005/019583 | 12/2005 |
| WO | PCT/JP2005/019582 | 1/2006 |
| WO | PCT/JP2005/019582 | 5/2007 |
| WO | PCT/JP2005/019583 | 5/2007 |

OTHER PUBLICATIONS

Japanese Office Action for corresponding JP Application No. 2004-032394, dated Jan. 19, 2010, pp. 1-5, Japan.
Japanese Office Action for corresponding JP Application No. 2004-316734, dated Dec. 8, 2009, pp. 1-4, Japan.
Japanese Office Action for corresponding JP Application No. 2004-316735, dated Feb. 9, 2010, pp. 1-15, Japan.
Japanese Office Action for corresponding JP Application No. 2007-157542, Jun. 9, 2009, Japan.
Japanese Office Action for corresponding JP Application No. 2007-157544, Jun. 9, 2009, Japan.
Taiwanese Office Action for related TW Application No. 94137601, Feb. 25, 2009, Taiwan.
Chinese Office Action for corresponding Patent Application No. CN200510007933.4, dated Jul. 17, 2009, China.
Japanese Office Action for corresponding JP Application No. 2004-251939, Jun. 30, 2009, Japan.
"Information technology—JPEG 2000 image coding system—Part 1: Core coding system," ISO/IEC 15444-1, Dec. 15, 2000, Annex H "Coding of images with regions of interest".
U.S. Appl. No. 11/718,211, filed Apr. 27, 2007, Taketa et al.
Japanese Office Action for related JP Application No. 2004-316735, Dec. 9, 2008, 4P, Japan.
Official Action Dated Oct. 14, 2008 From the JP Patent Office Re.: Application No. 2004-190802 (with English translation).
Official Action Dated Sep. 9, 2008 From the JP Patent Office Re.: Application No. 2004-316735 (with English translation).
U.S. Appl. No. 11/052,094, filed Feb. 8, 2005, Taketa et al.
Chinese Office Action issued in Chinese Application No. 2005100079334, dated Nov. 3, 2006 (issued in corresponding CN application to related U.S. Appl. No. 11/052,094).
Japanese Office Action for corresponding JP Application No. 2007-157542, Sep. 1, 2009, Japan.
Japanese Office Action for corresponding JP Application No. 2007-157544, Sep. 1, 2009, Japan.
Korean Office Action for corresponding KR Application No. 10-2007-7012013, Aug. 31, 2009, Korea.
Korean Office Action for corresponding KR Application No. 10-2008-7008106, Aug. 31, 2009, Korea.
Korean Office Action for corresponding KR Application No. 10-2008-7008107, Aug. 31, 2009, Korea.
Chinese Office Action for corresponding CN Application No. 200710197162.9, dated Oct. 30, 2009, China.
Japanese Office Action for corresponding Application No. JP 2007-157542, dated Aug. 31, 2010, pp. 1-14 Japan.
Japanese Office Action for corresponding Application No. JP 2007-157544, dated Aug. 31, 2010, pp. 1-13 Japan.
Japanese Office Action for corresponding JP Application No. 2004-316734, dated Jun. 22, 2010, pp. 1-4 Japan.
Japanese Office Action for corresponding JP Application No. 2007-144869, dated Jun. 22, 2010, pp. 1-6 Japan.
U.S. Office Action for corresponding U.S. Appl. No. 11/718,211, dated May 18, 2010, pp. 1-47.
Japanese Office Action for corresponding JP Application No. 2010-257512, dated Feb. 8, 2011, pp. 1-26 Japan.
U.S. Office Action for corresponding U.S. Appl. No. 12/621,952, dated Dec. 27, 2010, pp. 1-26.
Response to U.S. Office Action for corresponding U.S. Appl. No. 11/762,456, filed Apr. 5, 2011, pp. 1-8.
United States Office Action for corresponding U.S. Appl. No. 11/762,456, dated Jan. 18, 2011, pp. 1-17.
Response to Non-Final Office Action for corresponding U.S. Appl. No. 11/718,211, filed May 5, 2011, pp. 1-10.
U.S. Office Action for corresponding U.S. Appl. No. 11/718,211, dated Feb. 17, 2011, pp. 1-15.
Japanese Office Action for corresponding JP Application No. 2007-144869, dated Jun. 14, 2011, pp. 1-8, Japan.
Office Action for related U.S. Appl. No. 11/762,456, Jun. 10, 2011, pp. 1-95.
Japanese Office Action for corresponding JP Application No. 2007-144869, dated Jun. 14, 2001, pp. 1-8, Japan.
Japanese Office Action for corresponding JP Application No. 2004-316734, dated Mar. 29, 2011, pp. 1-6, Japan.
Office Action for U.S. Appl. No. 13/029,748 dated Mar. 15, 2012, pp. 1-34.

* cited by examiner

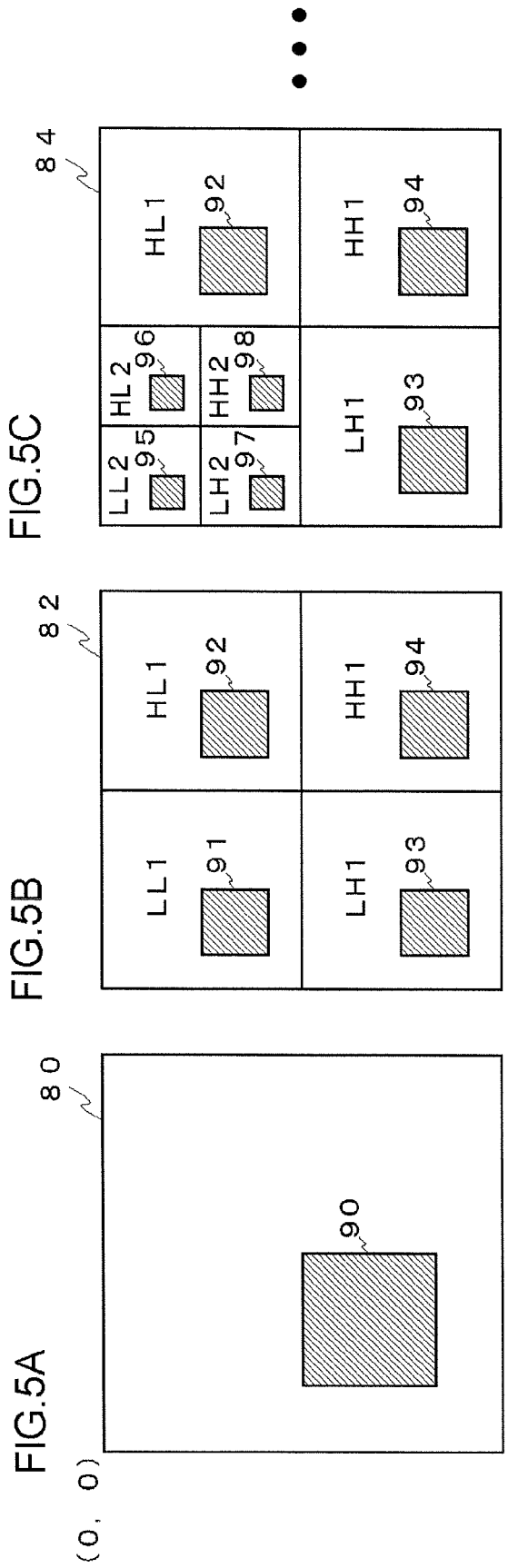

IMAGE CODING METHOD AND APPARATUS, AND IMAGE DECODING METHOD AND APPARATUS

CROSS REFERENCE TO RELATED APPLICATIONS

This application is related to, and claims the benefit of the earlier filing date under 35 U.S.C. §119(a) of, PCT/JP 2005/019583, filed Oct. 25, 2005, and Foreign Application JAPAN 2004-316735, filed Oct. 29, 2004.

TECHNICAL FIELD

This invention relates to an image coding technology and an image decoding technology, and it particularly relates to a coding method and a coding apparatus to preferentially decode a partial region of an image and a decoding method and a decoding apparatus therefor.

BACKGROUND TECHNOLOGY

At ISO/ITU-T, JPEG2000 using a discrete wavelet transform (DWT) is being standardized as a successor to JPEG (Joint Photographic Expert Group), which is a standard technology for compression and coding of still images. In JPEG2000, a wide range of image quality, from low bit-rate coding to lossless compression, can be coded highly efficiently, and a scalability function, in which the image quality is gradually raised, can be realized easily. Also, JPEG2000 comes with a variety of functions that the conventional JPEG standard did not have.

As one of the functions of JPEG2000, a ROI coding is standardized, in which a region of interest (Region of Interest; ROI) of an image is coded and transferred in preference to other regions. Because of the ROI coding, when the coding rate has an upper limit, the reproduced image quality of a region of interest can be raised preferentially, and also when a codestream is decoded in sequence, a region of interest can be reproduced earlier with high quality.

Patent Document 1 discloses a technology in which, at the time of a coding, the image quality is enhanced intensively for an image lying in an important range specified by an operator.
[Patent Document 1] Japanese Patent Application Laid-Open No. Hei07-203434.

Nevertheless, in the above-mentioned Patent Document 1, images in a specified range and those in other ranges are coded by their respectively specified image qualities. Accordingly, at the time of a decoding they are limited by their specified image qualities, so that it is difficult to decode them with a various resolutions. Also, it is difficult to achieve a reproduction processing such as one for reproducing only an image of a specified range.

DISCLOSURE OF THE INVENTION

The present invention has been made in view of the problems described as above, and an objective thereof is to provide an image coding method and an image coding apparatus capable of realizing various processings that utilize a region of interest when it is specified in a part of an image and to provide an image decoding method and an image decoding apparatus therefor.

In order to resolve the above problems, an image coding method according to one embodiment of the present invention is such that information for specifying a region of interest defined on an image is explicitly described in a codestream containing coded data of the image. The "information for specifying a region of interest" may be information which is coded by referring to difference information between frames. This "different information" may be represented by a variation between frames in at least one of position, size and shape of the region of interest. It may be a difference between an average value of at least one of values representing the position, size and shape of the region of interest in each frame and values corresponding to those of a frame to be coded. Alternatively, it may be a difference between an average value of a variation, between frames, of at least one of the position, size and shape of the region of interest and a variation of a corresponding value between frames in a frame to be coded. Further, it may be a difference between an average value of variations between frames and at least one of values representing the position, size and shape of the region of interest in each frame. This is effective if the region of interest is greatly enlarged and reduced and the like. The "information for specifying a region of interest defined on an image" may be coded as a function of time. This is effective in a case when the region of interest varies with a certain rule.

According to this embodiment, the aforementioned information is explicitly described in a codestream. Thus, if a region of interest is set within an image, useful information can be provided to a decoding side and various types of processings for the region of interest can be realized.

Another embodiment of the present invention relates to an image coding apparatus. This apparatus comprises: a region-of-interest setting unit which defines a region of interest (ROI) on an image; an image coding unit which encodes the image; a ROI information coding unit which encodes information for specifying the region of interest; and a codestream generator which generates a codestream by including therein the coded image and the coded information in an explicit manner. The "region-of-interest setting unit" may define the region of interest on the image by a specification from a user or by an automatic recognition of an object.

According to this embodiment, the aforementioned information is explicitly described in a codestream so as to generate the codestream. Thus, if a region of interest is set within an image, useful information can be provided to a decoding side and various types of processings for the region of interest can be realized.

When a plurality of regions of interest are defined on the image, a degree of priority is included in the information. According to this embodiment, the degrees of priority for a plurality of regions of interest can be recognized at a decoding side, so that a more elaborate processing is also achievable.

When a plurality of regions of interest are defined on the image, the information may be described in the order of the degree of priority thereof. According to this embodiment, the degrees of priority for a plurality of regions of interest can be recognized at a decoding side with a reduced amount of coded data.

Still another embodiment of the present invention relates to an image decoding method. This method is characterized in that a region including a region of interest is decoded from a codestream by referring to information for specifying the region of interest defined on an image wherein the information is explicitly described in the codestream that contains coded data of the image. The "region including a region of interest" may be a region of interest, a region including the region of interest and its peripheral region, or the entire image.

According to this embodiment, various processings for the regions of interest can be realized by referring to the information described implicitly in a codestream.

Still another embodiment of the present invention relates to an image decoding apparatus. This apparatus comprises: a region-of-interest information decoding unit which decodes information for specifying a region of interest defined on an image wherein the information is explicitly described in a codestream that contains coded data of the image; and an image decoding unit which decodes a region including the region of interest from the codestream by referring to the decoded information.

According to this embodiment, various processings for the regions of interest can be realized by referring to the information described explicitly in a codestream.

It is to be noted that any arbitrary combination of the aforementioned constituent elements and the expression of the present invention changed among a method, an apparatus, a system and so forth are also effective as the embodiments of the present invention.

EFFECTS OF THE INVENTION

According to the present invention, if a region of interest is specified in a part of an image, various processings utilizing the region of interest can be realized at a decoding side.

BRIEF DESCRIPTION OF THE DRAWINGS

FIGS. 5A-5C show ROI regions in each division level.

DESCRIPTION OF REFERENCE NUMERALS

10 wavelet transform unit, 12 quantization unit, 14 entropy coding unit, 16 codestream generator, 20 ROI setting unit, 22 ROI prediction processing unit, 24 ROI information coding unit, 30 coded data extraction unit, 32 entropy decoding unit, 34 inverse quantization unit, 36 inverse wavelet transform unit, 40 ROI information decoding unit, 42 ROI prediction processing unit, 44 ROI region control unit, 100 image coding apparatus, 200 image decoding apparatus.

THE BEST MODE FOR CARRYING OUT THE INVENTION

First Embodiment

Figure 1:
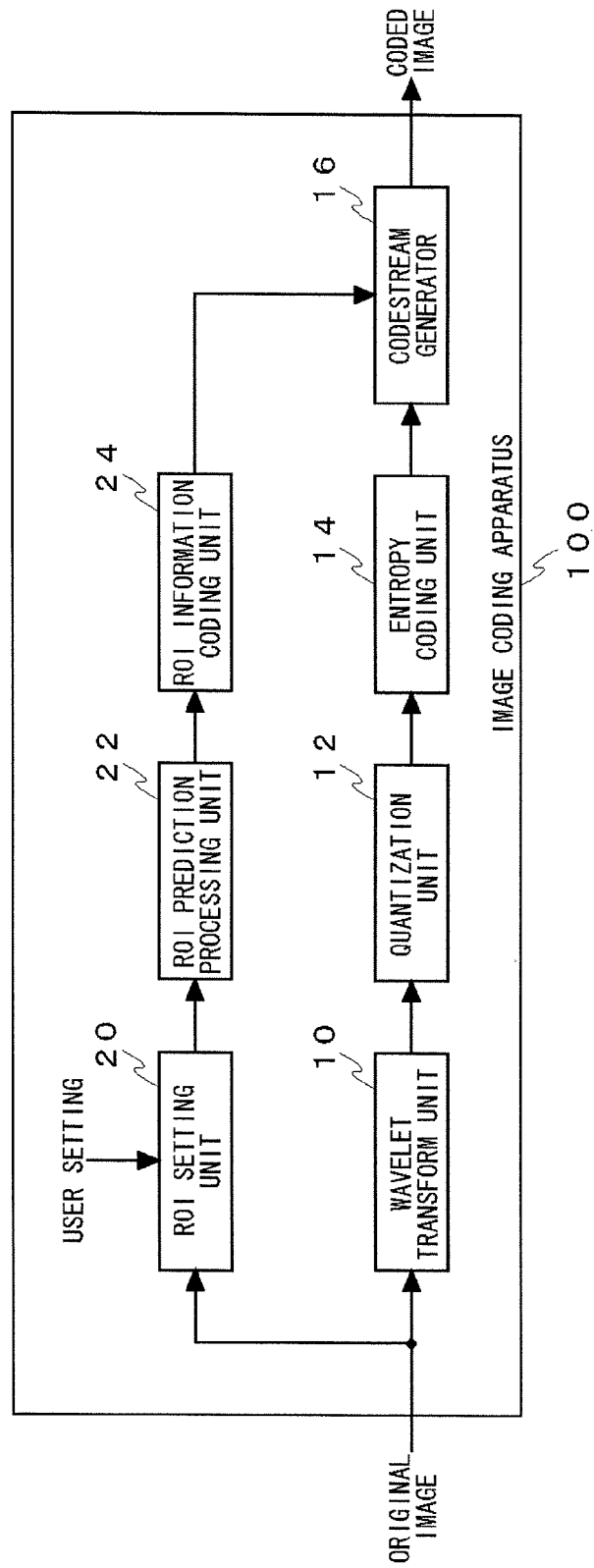
FIG. 1 shows a structure of an image coding apparatus according to a first embodiment.

FIG. 1 shows a structure of an image coding apparatus 100 according to a first embodiment.

In terms of hardware, the structure of the image coding apparatus 100 can be realized by a CPU, a memory and other LSIs of an arbitrary computer. In terms of software, it can be realized by memory-loaded programs which have coding functions and the like, but drawn herein are function blocks that are realized in cooperation with those. Hence, it is understood by those skilled in the art that these function blocks can be realized in a variety of forms such as by hardware only, software only or the combination thereof.

The image coding apparatus 100 performs compression and coding of inputted original images, which serve as an example, by JPEG2000 scheme. Original images inputted to the image coding apparatus 100 are frames of moving images. The image coding apparatus 100 can encode sequentially each frame of moving images and generate codestreams of the moving images.

A wavelet transform unit 10 divides the inputted original image into sub-bands, computes wavelet transform coefficients of each of the sub-bands and then generates hierarchized wavelet transform coefficients. More specifically, the wavelet transform unit 10 applies a low-pass filter and a high-pass filter in the respective x and y directions of an original image, and divides the image into four frequency sub-bands so as to carry out a wavelet transform. These sub-bands are an LL sub-band which has low-frequency components in both x and y directions, an HL sub-band and an LH sub-band which have a low-frequency component in one of the x and y directions and a high-frequency component in the other, and an HH sub-band which has high-frequency components in both x and y directions. The number of pixels in the vertical and horizontal directions of each sub-band is ½ of that of the image before the processing, and one time of filtering produces sub-band images whose resolution, or image size, is ¼ of the image.

The wavelet transform unit 10 performs another filtering processing on the image of the LL sub-band among the thus obtained sub-bands and divides it into another four sub-bands LL, HL, LH and HH so as to perform the wavelet transform. The wavelet transform unit 10 performs this filtering a predetermined number of times, hierarchizes the original image into sub-band images and then outputs wavelet transform coefficients for each of the sub-bands. A quantization unit 12 quantizes, with a predetermined quantizing width, the wavelet transform coefficients outputted from the wavelet transform unit 10.

An entropy coding unit 14 entropy-codes quantization values quantized by the quantization unit 12. For example, the coding is performed by scanning bit-planes in order from a high-order plane. In this manner, original images are subjected to coding by the entropy coding unit 14, which function as an image coding unit.

A ROI setting unit 20 sets a ROI region in a partial region of an original image. The shape of a ROI region may be a rectangle, a circular form or other complex forms. The shape thereof may be one that changes dynamically. For example, the shape of a ROI region may be varied between a center part and a peripheral part. Also, a ROI region may be provided in plurality on a single image.

Such a ROI region may be set manually by a user. Or it may be set by a system which automatically recognizes a region with a motion. More specifically, the user or system sets, in a ROI setting unit 20, the position, size and shape of a ROI, the order of priority thereof if a plurality of ROI regions are set and the like, as initial values. Note that if the user specifies an object or if the system automatically recognizes it, the ROI setting unit 20 may automatically set a predetermined range containing the object in the ROI region. For moving images, the user or system may set a ROI region per frame, or may specify a ROI region at first and then has it track the motion of an object lying within the ROI region. This can be realized by detecting motion vectors of an object.

The ROI setting unit 20 outputs information for specifying ROI regions, such as a starting position and the size of a ROI region, to a ROI prediction processing unit 22. (Hereinafter this information will be called ROI information.) When performing the above-described tracking processing, the ROI setting unit 20 may output a motion vector of a ROI region set based on the motion vector of the object.

The ROI prediction processing unit 22 performs interframe prediction processing on the ROI information. The ROI prediction processing unit 22 includes a memory for storing the ROI information. For example, the ROI prediction processing unit 22 stores the ROI information on a reference frame and calculates information on a difference from the current frame.

Figure 2A:
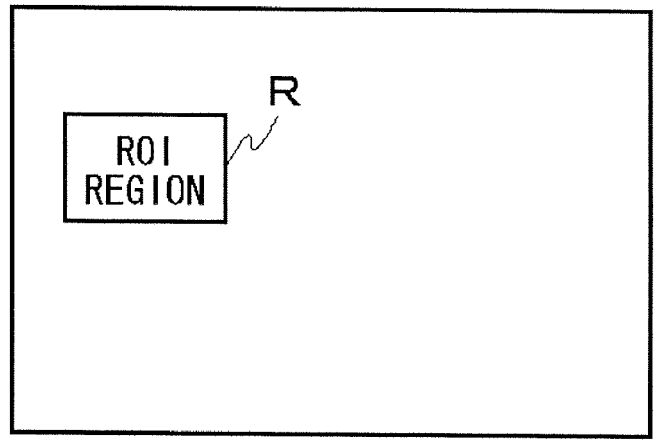
FIGS. 2A-2C are diagrams showing an example of a transition of a ROI region.
Figure 2B:
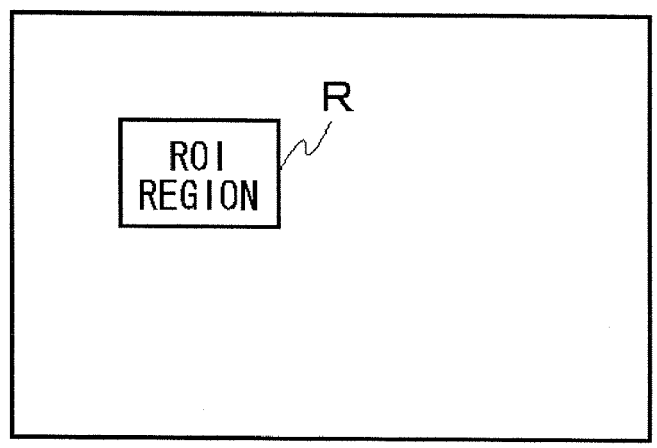
Figure 2C:
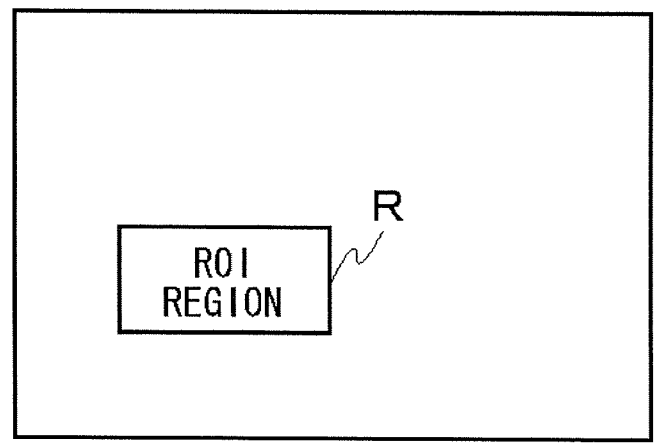

FIGS. 2A-2C are diagrams showing an example of a transition of a ROI region. FIG. 2A shows a state where a ROI region R is set within an image. This ROI region R, which is a rectangle, can be expressed by upper-left vertex coordinates, the size in the horizontal direction and the size in the vertical direction. Here, this is represented by coordinates (A, B) and size (X, Y). Firstly, the ROI prediction processing unit 22 outputs these pieces of information to a ROI information coding unit 24 as ROI information and, at the same time, stores it in the aforementioned memory. This frame serves as a reference for the next frame.

FIG. 2B shows a frame next to the frame shown in FIG. 2A, which indicates a state where the ROI R has moved. Here, the ROI region R has moved to the right by an amount of pixels equivalent to M1 in the image. If the ROI information on this ROI region R is expressed by the same method as described above, it will be represented by coordinates (A+M1, B) and size (X, Y). In this regard, using the ROI information on the previous frame stored in the memory, the ROI prediction processing unit 22 can express the ROI information on the current frame by the difference therebetween. For example, if the ROI information on the previous frame is subtracted from the ROI information generated in the current frame, the ROI information on the current frame will be expressed by coordinates $\Delta$(M1, 0) and size $\Delta$(0, 0). The ROI prediction processing unit 22 outputs this ROI information again to the ROI information coding unit 24 and, at the same time, stores it in the memory.

FIG. 2C shows a frame next to the frame shown in FIG. 2B, which indicates a state where the shape of the ROI R itself has changed. Here, the ROI region R has moved down by an amount of pixels equivalent to N2 and the ROI region R is enlarged by an amount of pixels equivalent to M2 in the horizontal direction in the image. When the ROI prediction processing unit 22 uses the ROI information on the previous frame stored in the memory to express the ROI information on the current frame through the same technique as the above, it can express the ROI information on the current frame as coordinates $\Delta$(0, −2N) and size $\Delta$(M2, 0). The ROI prediction processing unit 22 outputs this ROI information again to the ROI information coding unit 24 and, at the same time, stores it in the memory.

In this manner, the use of the inter-frame prediction processing can raise the occurrence rate of 0's and its neighboring values and thus can have the ROI information contain a statistical bias. If such ROI information is entropy-coded by the ROI information coding unit 24 described later, the amount of coded data can be reduced. The greater the non-uniformity of appearance frequency is, the amount of coded data in the entropy coding can be further reduced.

Note that the inter-frame prediction processing may use not only a processing where a difference from a previous frame is simply calculated, but also a motion compensation prediction processing. The motion compensation prediction processing can obtain a motion vector indicating a direction or distance in which the ROI region R has moved and regard a difference between the positional information represented by this motion vector and the current frame, as the ROI information. In particular, the motion compensation prediction processing can raise the frequency of appearance of 0's and its neighboring values for moving images where the movement of the ROI region R is large. In this manner, the frame to be subjected to the inter-frame prediction may be not only a frame immediately before the current one but also a future frame immediately after the current one. Furthermore, for example, a processing may be realizable where not only one preceding frame and one subsequent frame but also several frames preceding and subsequent thereto are used and their average value is used.

Also, it goes without saying that the ROI information can be generated within each frame without using the inter-frame prediction processing. In such a case, the memory capacity and the computational amount can be reduced. Accordingly, a user may be able to select whether the inter-frame prediction processing is to be used or not, according to the characteristics of moving images. There are also cases where, for fast moving images in particular, the use of the inter-frame prediction processing does not result in much reduction in the amount of coded data for an increase computational amount. In such a case, the ROI information may simply be generated for each frame.

The ROI information coding unit 24 encodes ROI information inputted from the ROI prediction processing unit 22. For example, the ROI information coding unit 24 performs entropy coding thereon. Then it outputs the coded ROI information to a codestream generator 16.

The codestream generator 16 produces a codestream based on the coded data of images inputted from the entropy coding unit 14 and the coded data of ROI information inputted from the ROI information coding unit 24. Then the codestream generator 16 outputs the thus produced codestream to a recording medium or network. Here, an SDRAM, a flash/hard disk drive or the like can be used as the recording medium.

The coded data of the ROI information are described in a header. Although there are several kinds of levels in the header, the coded data thereof may be described in any level. For example, the ROI information can be described in a stream header, a sequence header, a GOP (Group of Pictures) header, a frame header, a picture header, a header assigned for each region and the like.

The above-mentioned header assigned per region is a header as follows. For example, suppose that a plurality of ROI regions are set in a frame or picture. The frame or the picture is arranged in the order of image data of a ROI region 1, image data of a ROI region 2, . . . , image data of a peripheral region. Then, the above-mentioned header is a header which is assigned for each of the image data of the ROI region 1 or the image data of the ROI region 2.

Figure 3:
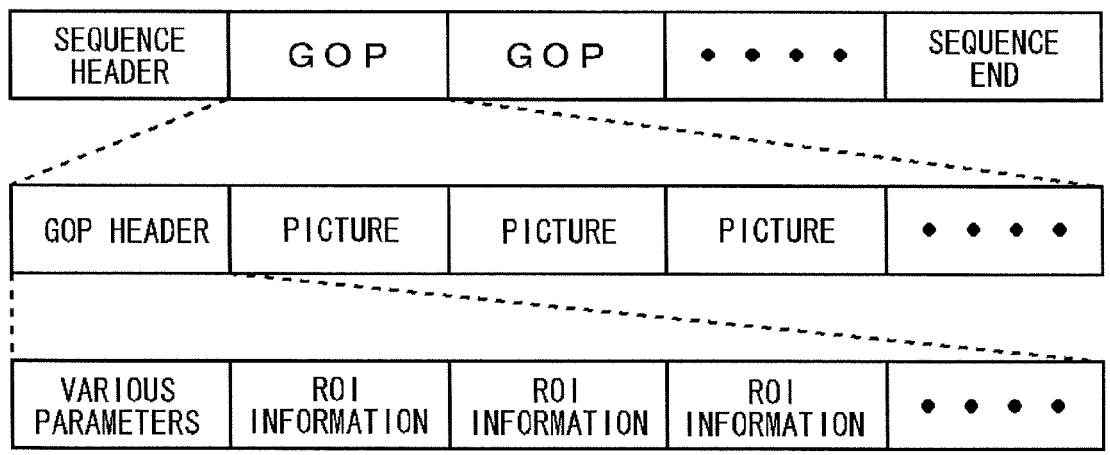
FIG. 3 is a diagram showing an example of a codestream.

FIG. 3 is a diagram showing an example of a codestream. Here, the codestream is indicated by a term "sequence" used in MPEG (Moving Picture Experts Group). In MPEG, a coded signal for the one entire video program is called a sequence. The sequence starts with a sequence header and ends with a sequence end as shown in FIG. 3, and a plurality of GOPs are described between them. The GOP describes a GOP header and a plurality of pictures. In the example shown in FIG. 3, a plurality of pieces of ROI information are described in this GOP header. Various parameters, such as coding conditions, required for a decoding are described in the GOP header. In the present embodiment, the ROI information is described therein, too.

The above-described ROI information is information indicating the vertex coordinates and the size. In this regard, the ROI information is not limited to such information but can contain various other information, and the ROI information can be identified by such information. Such examples are as follows.

Firstly, fundamental coordinates are required. As described above, the fundamental coordinates correspond to vertex coordinates, central point coordinates, barycentric coordinates or the like. Of these, coordinates suitable for the shape of a ROI region can be used. For example, if the ROI region is circular, the central point coordinates will be best suited. Next, if ROI information is to be specified using the information in each frame, the size will be required. For example, the size in the horizontal direction and the size in the vertical direction will be required. Next, if the inter-frame prediction processing is used, difference data from a previous frame, difference data from a subsequent frame using a motion vector, coefficients of various functions such as affine transform coefficients and the like may be used.

Next, if a plurality of ROI regions are set in a single image, the degree of priority therefor may be contained in the ROI information. For example, not only the priority order thereof but also information as to whether the displaying of said ROI region is indispensable or not may be contained therein. Also, this priority order may be expressed by the order in which the ROI information is arranged. That is, for example, a method is conceivable where the higher the priority order of information on a ROI region is, more anteriorly the information is located. Also, the information amount of each ROI region may be contained. For example, it may be the amount of coded data, the compression ratio, the computational amount and the like. Also, the image quality may be contained for each ROI region or the ratios in image quality of the ROI regions to other regions may be contained.

Further, information indicating whether the ROI region is decodable independently or not may be contained. For example, in the JPEG2000 scheme, three types of processing passes that are S pass (significance propagation pass), R pass (magnitude refinement pass) and C pass (cleanup pass) are used as each coefficient bit within a bit-plane. In S pass, insignificant coefficients each surrounded by significant coefficients are decoded. In R pass, significant coefficients are decoded. In C pass, the remaining coefficients are decoded. Each processing pass has a degree of contribution to the image quality of an image increased in the order of S pass, R pass and C pass. The respective processing passes are executed in this order and the context of each coefficient is determined in consideration of information on the surrounding neighbor coefficients. Thus, in a case where the coding is performed independently for each pass, it is possible to abort the variable-length decoding in the middle. Such information is beneficial to a decoding side. Other pieces of information than those described above may be contained in the ROI information as long as they can be utilized for the decoding as useful information. Note that although a description has been given of examples where the ROI information is described in the header, the user may describe it in a usable user region at his/her discretion.

According to the first embodiment described as above, information necessary or useful for decoding the ROI regions is explicitly included in a codestream, so that various types of processings utilizing said information can be realized in the decoding side. For example, if play at fast forward speed or the like is selected, ROI regions or regions containing some pixels that surround the ROI regions are extracted, thereby reproducing and displaying them easily.

Also, the amount of coded data in the ROI information can be reduced by coding the ROI information using the inter-frame prediction processing. For example, since in the JPEG2000 scheme the coding is performed in a manner that images are treated as still images, the ROI information must be given for every single image at the time of coding the ROI regions. Accordingly, if the ROI coding is performed on images having no motion therein, each of consecutive image data will be given the same ROI information and thereby wasteful codes will be produced as a whole. In such a case, the mode where the inter-frame prediction processing is used becomes very effective. Further, the reduction in the amount of coded data allows faster processing and reduces also the power consumption.

Second Embodiment

Figure 4:
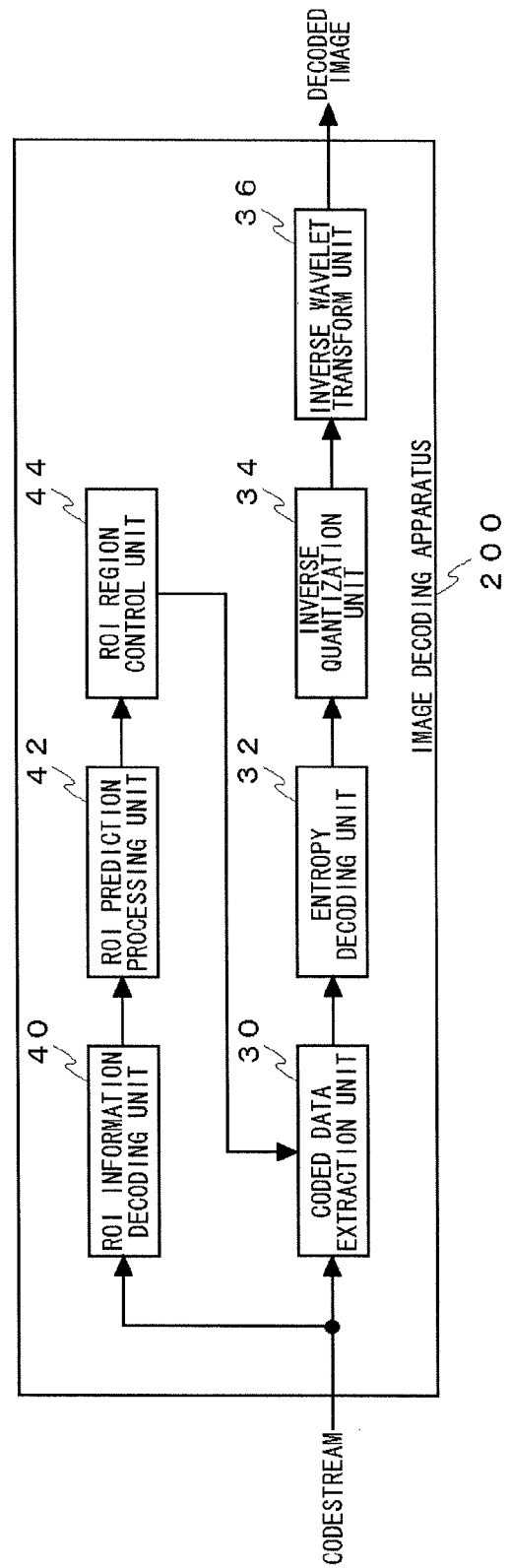
FIG. 4 shows a structure of an image decoding apparatus according to a second embodiment.

FIG. 4 shows a structure of an image decoding apparatus 200 according to a second embodiment. In the second embodiment, the image decoding apparatus 200 decodes the codestreams coded in the first embodiment. Moving pictures can be reproduced by continuously decoding each of coded frames of the moving images inputted as codestreams.

A ROI information decoding unit 40 decodes ROI information described in a codestream so as to be outputted to a ROI prediction processing unit 42. The ROI information is described in a header of any one of levels in the codestream.

A ROI prediction processing unit 42 performs inter-frame prediction processing on the decoded ROI information. The ROI prediction processing unit 42, which includes a memory for storing the ROI information, stores the ROI information on a reference frame, for example. The ROI information on a current frame given by difference information and the ROI information stored in the memory are added up so as to restore the ROI information on the current frame to a primitive data format.

For example, if a ROI region in the reference frame is rectangular, the ROI region can be expressed by the upper-left vertex coordinates (A, B), the size in the horizontal direction and the size in the vertical direction (X, Y). Firstly, the ROI prediction processing unit 42 outputs these pieces of information to a ROI region control unit 44 as ROI information and, at the same time, stores it in the aforementioned memory. This frame serves as a reference for the next frame.

Suppose that, in a case when ROI information is coded using the method employed in the first embodiment, the ROI region R moved to the right by an amount of pixels equivalent to M1 in the next frame. Then, coordinates $\Delta$(M1, 0), size $\Delta$(0, 0) and the ROI information will be given as its difference information. The ROI prediction processing unit 42 can obtain the absolute coordinates (A+M1, B) and the magnitude (X, Y) of the current frame by adding this difference information to the ROI information on a previous frame stored in the memory.

In this manner, before decoding an image, the ROI prediction processing unit 42 decodes the ROI information on the next screen and acquires it. Thereby, various types of processing for the ROI regions becomes possible. If other inter-frame prediction codings are used, decoding methods appropriate for them will be used.

The ROI region control unit 44 sets various processings for ROI regions, upon request of a user or a system. For example, a processing of reproducing the image of ROI regions only or reproducing the images of regions containing their peripheral pixels is also possible. Also, if a certain scene is searched through an object recognition, a search processing where an object only within a ROI region is to be processed will be possible. In any of these, high-speed processing is possible. In doing these processings, the processing can be carried out by referring to priority order information contained in the ROI information. For example, a ROI region not required to be displayed, a ROI region having a lower priority order is not displayed or such a region can be set aside from the items to be searched.

Besides these, the ROI region control unit 44 can set the image quality of ROI regions and the ratios in image quality of the ROI regions to other regions according to a specification by the ROI information or upon request of a user or a system.

A coded data extraction unit 30 extracts coded data from an inputted codestream. In so doing, only the coded data of a region specified from the ROI region control unit 44 may be extracted. An entropy decoding unit 32 decodes the extracted coded data bit-plane by bit-plane so as to acquire quantized wavelet transform coefficients obtained as a result of the decoding. An inverse quantization unit 34 inverse-quantizes the wavelet transform coefficients. An inverse wavelet transform unit 36 performs an inverse wavelet transform on the inverse-quantized wavelet transform coefficients and outputs a decoded image thus obtained.

Next, a description is given of a method for determining by the ROI region control unit 44 the coordinates and the size of regions containing a ROI region and its peripheral region. FIGS. 5A-5C show ROI regions in each division level of wavelet transform coefficients. FIG. 5A shows a state where a ROI 90 is set on an original image 80 of division level "0". FIG. 5B shows an image 82 of division level "1" obtained by performing one time wavelet transform on the original image 80. A transform image 82 of division level "1" is constituted by four sub-bands LL1, HL1, LH1 and HH1. The ROI region control unit 44 specifies ROI regions 91 to 94 in the transform image 82 of division level "1" necessary for restoring the ROI region 90 in the original image 80 at each of sub-bands LL1, HL1, LH1 and HH1 of division level "1".

FIG. 5C shows a transform image 84 of division level "2" which is obtained by performing another wavelet transform on the sub-band LL1 that is the lowest frequency component of the transform image 82 shown in FIG. 5B. As shown in the figure, the transform image 84 contains four sub-bands LL2, HL2, LH2 and HH2 of division level "2" in addition to three sub-bands HL1, LH1 and HH1. The ROI region control unit 44 specifies ROI regions 95 to 98 on the transform image 84 of division level "2" necessary for restoring the ROI region 91 in the sub-band LL1 of division level "2" at each of the sub-bands LL2, HL2, LH2 and HH2.

In the similar manner, by specifying recursively the ROI regions that correspond to the ROI region 90 in the original image 80 at each division level for a certain number of times corresponding to the number of wavelet transforms done, all ROI transform images necessary for restoring the ROI region 90 can be specified in a transform image of a final division level.

The ROI region control unit 44 determines a starting position and the size of a targeted region of wavelet transform coefficients to be decoded, in each sub-band at each division level, in a manner such that the decoding is done up to the original image 80 without causing noise in a peripheral region of the ROI region set on the original image 80. They are set in the coded data extraction unit 30.

If the x or y coordinate of the ROI region where it starts in the original image 80 is denoted by P and the size of the ROI region in the x or y direction is Q, the starting coordinates and the size of a region to be decoded at each division level will be as follows.

| | |
|---|---|
| Division level 1- | Starting coordinate $P/2 - \alpha$, Size $Q/2 + \beta$ |
| Division level 2- | Starting coordinate $(P/2 - \alpha)/2 - \alpha$, Size $(Q/2 + \beta)/2 + \beta$ |
| Division level 3- | Starting coordinate $\{(P/2 - \alpha)/2 - \alpha\}/2 - \alpha$, Size $\{(Q/2 + \beta)/2 + \beta\}/2 + \beta$ |
| Division level J- | Starting coordinate $[\ldots]/2 - \alpha$, Size $[\ldots]/2 + \beta$ |

By performing the above calculation about x and y, the starting coordinates and the size of a region to be decoded at each division level can be obtained. If, in the starting coordinates, a value immediately before the last $\alpha$ is subtracted has digits after the decimal point, the digits after the decimal point will be discarded. If, on the other hand, in the size a value immediately before the last $\beta$ is added has digits after the decimal point, the value will be rounded up. Although the values of $\alpha$ and $\beta$ may be set arbitrarily by a designer, the setting such as $\alpha=1$ and $\beta=1$ or $\alpha=2$ and $\beta=4$ is possible. If the peripheral region is set in the top, bottom, left and right of a ROI region in a symmetrical manner, the value of $\beta$ will be twice as much as that of $\alpha$. This value depends on a filter used. It is preferable that the greater the number of filterings is, the larger the amount of pixels taken for the peripheral region will be.

According to the second embodiment described as above, the ROI information explicitly described in the codestream is decoded, so that various types of processings utilizing said information can be realized. For example, ROI regions or regions containing their peripheral pixels are extracted, so that they can be reproduced and displayed easily. Also, ROI regions and the other regions can be reproduced at desired image qualities, respectively.

The present invention has been described based on the embodiments. The embodiments are exemplary, and it is understood by those skilled in the art that various modifications to the combination of each component and each process thereof are possible and that such modifications are also within the scope of the present invention. Such modifications will be given as follows.

In the above embodiments, the ROI region may be a region that contains an object only. In this case, the system can describe information for specifying the object in a header or the like. Similar to the embodiments, if information on a change in the shape of this object and the like are described using the inter-frame prediction processing, the amount of coded data for said information can be reduced.

In the above embodiments, codestreams of moving images coded continuously in compliance with the JPEG2000 scheme are decoded. However, it is not limited to the JPEG2000 scheme, and any other schemes may be used as long as it is used to decode the codestream of moving images.

A description was given of the wavelet transform as a spatial filtering for the coding of images but other spatial frequency transforms may be used. For example, the discrete cosine transform used in the JPEG standard may be used.

INDUSTRIAL APPLICABILITY

The present invention can be used for an apparatus for coding images or an apparatus for decoding images.

What is claimed is:

1. A computer-implemented image decoding method characterized in that a region including a region of interest is decoded from a codestream by referring to information for specifying the region of interest defined on an image wherein the information is explicitly described, not as a header, but in the codestream that contains coded data of the image, the image decoding method performed by a processor in accordance with instructions stored in a memory, wherein when a plurality of regions of interest are defined on the image, the information for specifying the plurality of regions of interest includes information indicating a degree of priority thereof, and information indicating whether the display of each of the regions of interest is essential, wherein if the information indicates a region of interest as not essential, that region of interest is not displayed.

2. The computer-implemented image decoding method according to claim 1, wherein the information for specifying the plurality of the regions of interest includes a degree of priority of the respective region of interest, and wherein the respective region of interest is processed according to the degree of priority thereof.

3. An image decoding apparatus, comprising:
a region-of-interest information decoding unit including at least one processor acting in accordance with instructions stored in a memory, which decodes information for specifying a region of interest defined on an image wherein the information is explicitly described, not as a header, but in a codestream that contains coded data of the image; and
an image decoding unit which decodes a region including the region of interest from the codestream by referring to the decoded information, wherein
when a plurality of regions of interest are defined on the image, the information for specifying the plurality of regions of interest includes information indicating a degree of priority thereof, and information indicating whether the display of each region of interest is essential, wherein if the information indicates a region of interest as not essential, that region of interest is not displayed.

4. The image decoding apparatus according to claim 3, wherein when a plurality of regions of interest are defined on the image, the region-of-interest information decoding unit decodes information for specifying the plurality of the regions of interest defined on the image, and wherein the image decoding unit decodes the plurality of the regions of interest from the codestream by referring to the decoded information.

5. The image decoding apparatus according to claim 4, wherein the image decoding unit processes the respective region of interest of the plurality of regions of interest according to the degree of priority thereof.

6. A computer-implemented image decoding method characterized in that a region including a region of interest is decoded from a codestream by referring to information for specifying the region of interest defined on a moving image wherein the information is explicitly described, not as a header for each frame of the moving image, but in the codestream that contains coded data of the moving image, the image decoding method performed by a processor in accordance with instructions stored in a memory, wherein
when a plurality of regions of interest are defined on the moving image, the information for specifying the plurality of regions of interest includes information indicating a degree of priority thereof, and information indicating whether the display of each region of interest is essential, wherein if the information indicates a region of interest as not essential, that region of interest is not displayed.

7. The computer-implemented image decoding method according to claim 6, wherein when a plurality of regions of interest are defined on the moving image, the plurality of the regions of interest is decoded from a codestream by referring to information for specifying the plurality of the regions of interest defined on the moving image.

8. The computer-implemented image decoding method according to claim 7, wherein the respective region of interest of the plurality of regions of interest is processed according to the degree of priority thereof.

9. An image decoding apparatus, comprising:
a region-of-interest information decoding unit including at least one processor acting in accordance with instructions stored in a memory, which decodes information for specifying a region of interest defined on a moving image wherein the information is explicitly described, not as a header for each frame of the moving image, but in a codestream that contains coded data of the moving image; and
an image decoding unit which decodes a region including the region of interest from the codestream by referring to the decoded information, wherein
when a plurality of regions of interest are defined on the moving image, the information for specifying the plurality of regions of interest includes information indicating a degree of priority thereof, and information indicating whether the display of each region of interest is essential, wherein if the information indicates a region of interest as not essential, that region of interest is not displayed.

10. The image decoding apparatus according to claim 9, wherein when a plurality of regions of interest are defined on the moving image, the region-of-interest information decoding unit decodes information for specifying the plurality of the regions of interest defined on the moving image, and wherein the image decoding unit decodes the plurality of the regions of interest from the codestream by referring to the decoded information.

11. The image decoding apparatus according to claim 10, wherein the image decoding unit processes the respective region of interest of the plurality of regions of interest according to the degree of priority thereof.

* * * * *